US011964473B2

(12) United States Patent
Nunokawa

(10) Patent No.: US 11,964,473 B2
(45) Date of Patent: Apr. 23, 2024

(54) PRINTING APPARATUS AND PRINTING METHOD

(71) Applicant: SEIKO EPSON CORPORATION, Tokyo (JP)

(72) Inventor: Yohei Nunokawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 636 days.

(21) Appl. No.: 17/128,710

(22) Filed: Dec. 21, 2020

(65) Prior Publication Data

US 2021/0197595 A1 Jul. 1, 2021

(30) Foreign Application Priority Data

Dec. 25, 2019 (JP) ................................ 2019-234970

(51) Int. Cl.

*B41J 13/00* (2006.01)
*B41J 2/21* (2006.01)
*B41J 11/00* (2006.01)
*B41J 13/10* (2006.01)

(52) U.S. Cl.

CPC ......... *B41J 13/0027* (2013.01); *B41J 2/2103* (2013.01); *B41J 11/0095* (2013.01); *B41J 13/10* (2013.01)

(58) Field of Classification Search

CPC ..................................................... B41J 2/2103
See application file for complete search history.

(56) References Cited

U.S. PATENT DOCUMENTS 8,888,238 B2 * 11/2014 Naruse ................. B41J 25/3086 347/37
10,668,740 B2 * 6/2020 Kunioka .................. D06P 5/00
2017/0334213 A1 11/2017 Hamada
2018/0345691 A1 12/2018 Kunioka

FOREIGN PATENT DOCUMENTS

JP 2014-004707 1/2014
JP 2014004707 A * 1/2014
JP 2017-209797 11/2017
JP 2018-202858 12/2018

OTHER PUBLICATIONS

Translation of JP-2014004707-A; Clarivate Analytics. (Year: 2023).*

* cited by examiner

*Primary Examiner* — Howard J Sanders
(74) *Attorney, Agent, or Firm* — WORKMAN NYDEGGER

(57) ABSTRACT

A printing apparatus includes an image formation unit, a tray on which a medium is placed, a movement unit, and a control unit. The image formation unit includes a first head forming a first image and a second head forming a second image. The movement unit is provided so as to be capable of moving the tray to a first position at which the medium is placed and a second position serving as a reference position. The control unit switches between a first mode and a second mode. In the first mode, a starting position is moved to an image forming region, and the tray is not moved to the second position, and a movement direction is changed to form the first image and the second image. In the second mode, after the first image is formed, the tray is moved to the second position, and then the movement direction is changed to form the second image.

6 Claims, 12 Drawing Sheets

PRINTING APPARATUS AND PRINTING METHOD

The present application is based on, and claims priority from JP Application Serial Number 2019-234970, filed Dec. 25, 2019, the disclosure of which is hereby incorporated by reference herein in its entirety.

BACKGROUND

1. Technical Field

The present disclosure relates to a printing apparatus that performs printing on a medium, and a printing method when printing is performed on a medium.

2. Related Art

In a liquid discharge device described in JP 2017-209797 A, after a tray on which a medium is placed is moved to a printing starting position, a first image forming operation is performed by forming a first image as a foundation layer with a white ink, and after the tray is moved to the printing starting position again, a second image forming operation is performed by forming a second image with color inks.

In the liquid discharge device of JP 2017-209797 A, in order to improve image quality of the printing, calibration needs to be performed with a position at the start of printing of a placement unit on which the medium is placed as a calibration position, and a position of the first image and a position of the second image need to be adjusted with high accuracy.

However, in a case where the image quality of the printing is not required, when the placement unit is moved to the calibration position each time, there is a possibility that a time required for printing once may be long and productivity may be low.

SUMMARY

In order to solve the above-described problem, a printing apparatus according to the present disclosure includes an image forming unit including a first forming unit configured to form a first image on a medium using a first color, and a second forming unit configured to form a second image on the medium using a second color different from the first color, a placement unit on which the medium is placed, a moving unit configured to move the placement unit in a first direction before image formation is performed, and in a second direction opposite to the first direction when image formation is performed, and a control unit configured to control the movement of the placement unit by the moving unit and the image formation by the image forming unit, wherein the moving unit is capable of moving the placement unit to a first position at which the medium is placed on the placement unit, and to a second position positioned on a side opposite to the first position in the second direction with respect to the image forming unit, the second position serving as a reference position for the movement of the placement unit, and the control unit switches between a first mode for moving a starting position of the image formation on the medium placed on the placement unit from the first position to an image forming region of the image forming unit in the first direction, and changing a movement direction of the placement unit from the first direction to the second direction without moving the placement unit to the second position, and forming the first image and the second image on the medium while moving the placement unit in the second direction, and a second mode for, after forming the first image, moving the placement unit to the second position, changing the movement direction from the first direction to the second direction, and forming the second image on the medium, and performs the mode.

Here, in "the first mode for changing the movement direction from the first direction to the second direction, and forming the first image and the second image on the medium", "forming the first image and the second image" includes both, after forming the first image, that is, (i) forming the first image while moving the placement unit in the second direction, then moving the placement unit in the first direction, performing the above "change of the movement direction of the placement unit from the first direction to the second direction", and forming the second image on the medium while moving the placement unit in the second direction, and (ii) after forming the first image on the medium, without changing the movement direction, forming the second image on the medium.

In order to solve the above-described problem, a printing method according to the present disclosure is a printing method for a printing apparatus that includes an image forming unit including a first forming unit configured to form a first image on a medium, and a second forming unit configured to form a second image on the medium, a placement unit on which the medium is placed, and a moving unit configured to move the placement unit in a first direction before image formation is performed, and in a second direction opposite to the first direction when image formation is performed, in which the moving unit is capable of moving the placement unit to a first position at which the medium is placed on the placement unit, and to a second position positioned on a side opposite to the first position in the second direction with respect to the image forming unit, the second position serving as a reference position for the movement of the placement unit, wherein a starting position of the image formation on the medium placed on the placement unit is moved from the first position past an image forming region of the image forming unit in the first direction, and the placement unit is not moved to the second position, the first direction is changed to the second direction, and while movement is performed in the second direction, the first image and the second image are formed on the medium, or, after the placement unit is moved from the first position to the second position, the first direction is changed to the second direction, and the first image and the second image are formed on the medium.

Note that, in the printing apparatus and the printing method according to the present disclosure, printing in the second mode includes printing in which, after printing is started from the second position to form the first image, the placement unit is moved to the second position again to form the second image.

DESCRIPTION OF EXEMPLARY EMBODIMENTS

Figure 1:
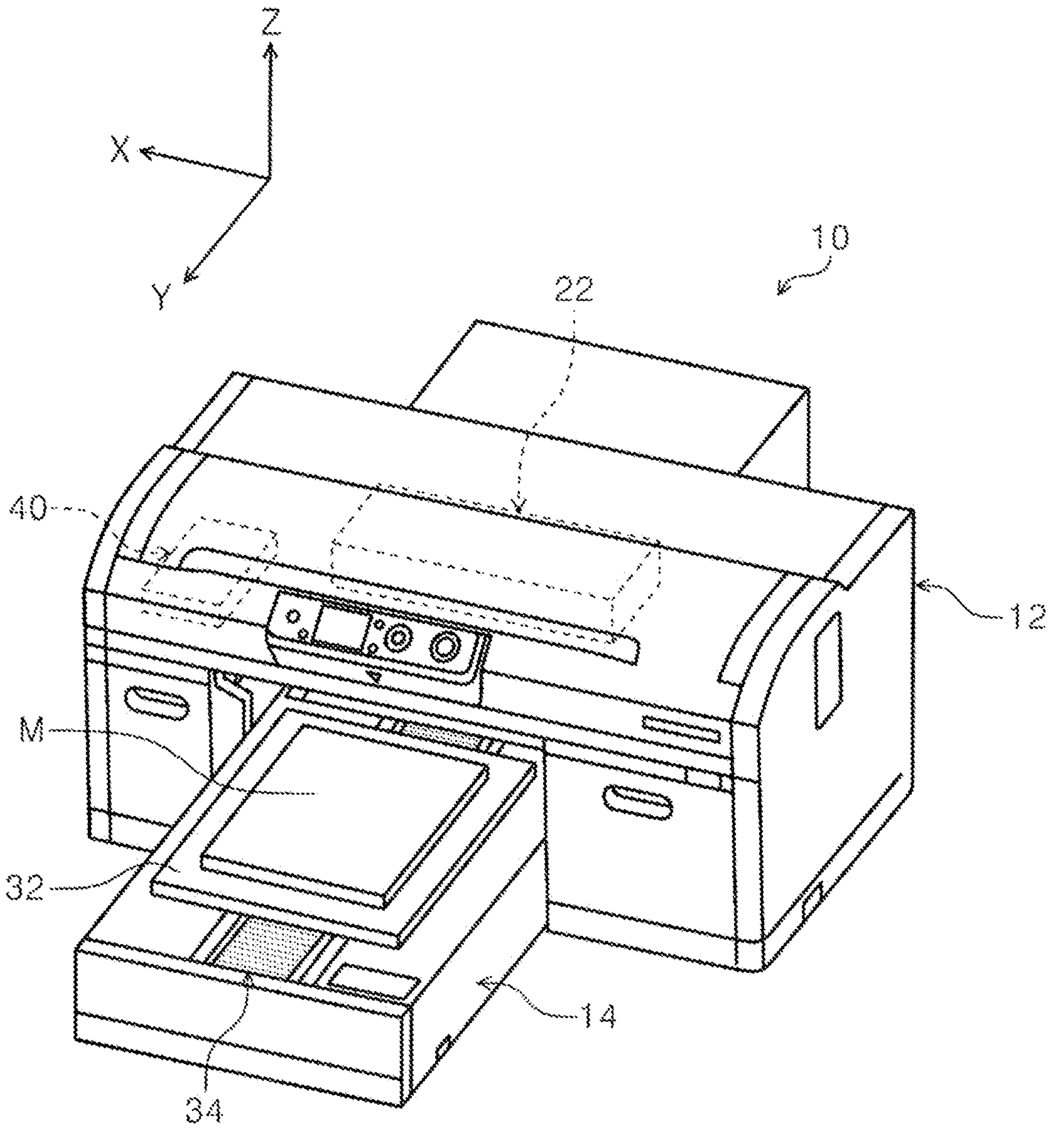
FIG. 1 is a schematic perspective view illustrating a printing apparatus according to Exemplary Embodiment 1.

Hereinafter, the present disclosure will be schematically described.

In order to solve the above-described problem, a printing apparatus according to a first aspect of the present disclosure includes an image forming unit including a first forming unit configured to form a first image on a medium using a first color, and a second forming unit configured to form a second image on the medium using a second color different from the first color, a placement unit on which the medium is placed, a moving unit configured to move the placement unit in a first direction before image formation is performed, and in a second direction opposite to the first direction when image formation is performed, and a control unit configured to control the movement of the placement unit by the moving unit and the image formation by the image forming unit, wherein the moving unit is capable of moving the placement unit to a first position at which the medium is placed on the placement unit, and to a second position positioned on a side opposite to the first position in the second direction with respect to the image forming unit, the second position serving as a reference position for the movement of the placement unit, and the control unit switches between a first mode for moving a starting position of the image formation on the medium placed on the placement unit from the first position to an image forming region of the image forming unit in the first direction, and changing a movement direction of the placement unit from the first direction to the second direction without moving the placement unit to the second position, and forming the first image and the second image on the medium while moving the placement unit in the second direction, and a second mode for, after forming the first image, moving the placement unit to the second position, changing the movement direction from the first direction to the second direction, and forming the second image on the medium, and performs the mode.

According to the present aspect, the control unit, in the first mode, moves the starting position of the image formation on the medium placed on the placement unit from the first position to the image forming region of the image forming unit in the first direction, and does not move the placement unit to the second position, changes the movement direction of the placement unit from the first direction to the second direction, and forms the first image and the second image on the medium while moving the placement unit in the second direction. Accordingly, the placement unit is not moved to the second position, which eliminates a need for a time for movement thereof and productivity of the printing can be improved. Furthermore, a distance of movement for moving the placement unit until the movement in the first direction is changed to the movement in the second direction is determined based on the starting position of the image formation on the medium, and thus the distance of movement in the first mode can be reduced, and thus the productivity of the printing can be improved.

On the other hand, the control unit, in the second mode, moves the placement unit to the second position, and changes the movement direction of the placement unit from the first direction to the second direction to form the second image on the medium. Accordingly, the second position serves as a reference position for calibrating a position of the placement unit, and the first image and the second image are overlapped each other based on the reference position, thus a position shift of an arrangement of the second image with respect to the first image can be suppressed, and thus a high-quality image can be formed. Further, a position shift of an arrangement of the first image and the second image with respect to the medium can be suppressed, and thus a high-quality image can be formed.

A printing apparatus according to a second aspect is the printing apparatus according to the first aspect, wherein the control unit, in the first mode, after forming the first image on the medium, without changing the movement direction, forms the second image on the medium.

According to the present aspect, the control unit, in the first mode, after forming the first image on the medium, without changing the movement direction, forms the second image on the medium. In this way, as compared to a configuration in which after the first image is formed on the medium, the placement unit is returned to the second position, and the second image is formed on the medium, a position shift of the image formation in association with switching of the movement direction of the placement unit is unlikely to occur, and thus a position shift of an arrangement of the second image with respect to the first image can be suppressed.

A printing apparatus according to a third aspect is the printing apparatus according to the first aspect or the second aspect, wherein the first image is formed in a white color as the first color, the second image is formed in the white color and a color other than the white color as the second color, and the second forming unit is positioned downstream of the first forming unit in the second direction.

According to the present aspect, the first image is formed in the white color as the first color, and the second image is formed in the white color and the color other than the white color as the second color. In other words, the first image is formed of a white layer, and the second image is formed of a white layer and a layer of the color other than white color. Further, the first forming unit is fixed in a state of positioned upstream of the second forming unit, thus in the second image, an image formed in the white color and an image formed in the color other than the white color do not shift in position from each other. However, when a drying rate of a liquid corresponding to the white color is different from a drying rate of a liquid corresponding to the color other than the white color, in second image, the white layer and the layer of the color other than the white color may be blended. According to the present aspect, the second image in the white color is formed on the medium upstream in the second direction, and after the second image dries, the second image in the color different from the white color is formed downstream in the second direction, thus, blending of the white color and other colors in the second image can be suppressed.

Furthermore, when the second image is formed in an overlapping manner, one of the second images and another of the second images can be formed while the placement unit is moved in the second direction, thus, in addition to the above, productivity of image formation (three-layer printing) with the first image, the one of the second images, and the other of the second images can be improved.

A printing apparatus according to a fourth aspect is the printing apparatus according to any one of the first to third aspects, wherein the image forming unit is configured to be movable in a scanning direction intersecting with the first direction and the second direction, and the first forming unit is positioned on one side and another side of the second forming unit in the scanning direction.

According to the present aspect, the first forming unit and the second forming unit are positioned at an identical position in the second direction, and thus the image forming unit can be made smaller in the second direction.

Furthermore, even when the image forming unit is moved to any of the one side and the other side in the scanning direction, after the first image is formed by the first forming unit, the second image is formed by the second forming unit. Accordingly, the image forming unit can be moved to both the one side and the other side in the scanning direction, and there is no need to return the image forming unit to an origin position in the scanning direction each time, thereby improving the productivity of the printing.

A printing apparatus according to a fifth aspect is the printing apparatus according to any one of the first to fourth aspects, further including a measurement unit configured to measure an interval between the medium and the image forming unit, and an adjustment unit configured to move the image forming unit or the placement unit such that a value measured in the measuring unit is a set value to adjust the interval between the medium and the image forming unit, wherein the control unit operates the adjustment unit between the first position and the second position.

According to the present aspect, while the placement unit is moved from the first position to the second position, the measurement unit measures the interval between the medium and the image forming unit. Then, the adjustment unit moves the image forming unit or the placement unit such that the value measured in the measurement unit is the set value. In this way, while the placement unit is moved from the first position to the second position, the interval between the medium and the image forming unit is adjusted, thus as compared to a configuration in which the interval between the medium and the image forming unit is adjusted after the placement unit reaches the second position, an elapsed time from a movement start time point of the placement unit to a printing start time point can be shortened.

A printing method according to a sixth aspect is a printing method for a printing apparatus that includes an image forming unit including a first forming unit configured to form a first image on a medium, and a second forming unit configured to form a second image on the medium, a placement unit on which the medium is placed, and a moving unit configured to move the placement unit in a first direction before image formation is performed, and in a second direction opposite to the first direction when image formation is performed, in which the moving unit is capable of moving the placement unit to a first position at which the medium is placed on the placement unit, and to a second position positioned on a side opposite to the first position in the second direction with respect to the image forming unit, the second position serving as a reference position for the movement of the placement unit, wherein a starting position of the image formation on the medium placed on the placement unit is moved from the first position past an image forming region of the image forming unit in the first direction, and the placement unit is not moved to the second position, the first direction is changed to the second direction, and while movement is performed in the second direction, the first image and the second image are formed on the medium, or, after the placement unit is moved from the first position to the second position, the first direction is changed to the second direction, and the first image and the second image are formed on the medium.

According to the present aspect, the control unit, in the first mode, moves the starting position of the image formation on the medium placed on the placement unit from the first position past the image forming region of the image forming unit in the first direction, and does not move the placement unit to the second position, changes the first direction to the second direction, and during movement in the second direction, forms the first image and the second image on the medium. Accordingly, the placement unit is not moved to the second position, which eliminates a need for a time for movement thereof and productivity of the printing can be improved. Furthermore, a distance of movement for moving the placement unit until the movement in the first direction is changed to the movement in the second direction is determined based on the starting position of the image formation on the medium, and thus the distance of movement in the first mode can be reduced without waste, and thus the productivity of the printing can be improved.

On the other hand, the control unit, in the second mode, after moving the placement unit from the first position to the second position, changes the movement direction of the placement unit from the first direction to the second direction to form the second image on the medium. Accordingly, the second position serves as a reference position for calibrating a position of the placement unit, and the first image and the second image are overlapped each other based on the reference position, thus a position shift of an arrangement of the second image with respect to the first image can be suppressed, and thus a high-quality image can be formed.

Note that, in the printing apparatus and the printing method according to the above aspect, printing in the second mode includes printing in which, after printing is started from the second position to form the first image, the placement unit is moved to the second position again to form the second image.

Exemplary Embodiment 1

Hereinafter, Exemplary Embodiment 1 as an example of a printing apparatus and a printing method according to the present disclosure will be described in detail with reference to the appended drawings. In an X-Y-Z coordinate system represented in each of the drawings, for a printing apparatus 10 described below, an X-axis is an axis along an apparatus width direction or an X direction, a Y-axis is an axis along an apparatus depth direction or a Y direction and a movement direction when a medium M is moved, and a Z-axis is an axis along an apparatus height direction. A direction from a front side toward a back side in the Y direction is referred to as a −Y direction, and a direction from the back side toward the front side is referred to as a +Y direction. The −Y direction is an example of a first direction. The +Y direction is an example of a second direction. Note that, for each of the X, Y, and Z directions, when a description of a configuration is valid regardless of a negative/positive sign, a sign is not assigned and representation such as X direction is used, for example, and this means the +X direction or the −X direction.

When distinguishing between a left side and a right side when viewed from a front in the X direction, the left side is referred to as a +X side, and the right side is referred to as a −X side. When distinguishing between the front side and the back side in the Y direction, the front side is referred to as a +Y side, and the back side is referred to as a −Y side. When distinguishing between an upper side and a lower side in the Z direction, the upper side is referred to as a +Z side, and the lower side is referred to as a −Z side.

FIG. 1 illustrates the printing apparatus 10 as an example of the printing apparatus. The printing apparatus 10 prints various types of information about the medium M.

A variety of materials can be used as the medium M, including textiles (fabric, cloth, and the like), paper, vinyl chloride resin, and the like.

As an example, the printing apparatus 10 includes a main body unit 12 and a support unit 14 supporting the medium M. Specifically, the printing apparatus 10 includes an image formation unit 22, a tray 32, a movement unit 34, and a control unit 40. In addition, the printing apparatus 10 includes an adjustment unit 16 (FIG. 6), a position sensor 54, and a height sensor 56 (FIG. 3) described later.

Image Formation Unit

Figure 2:
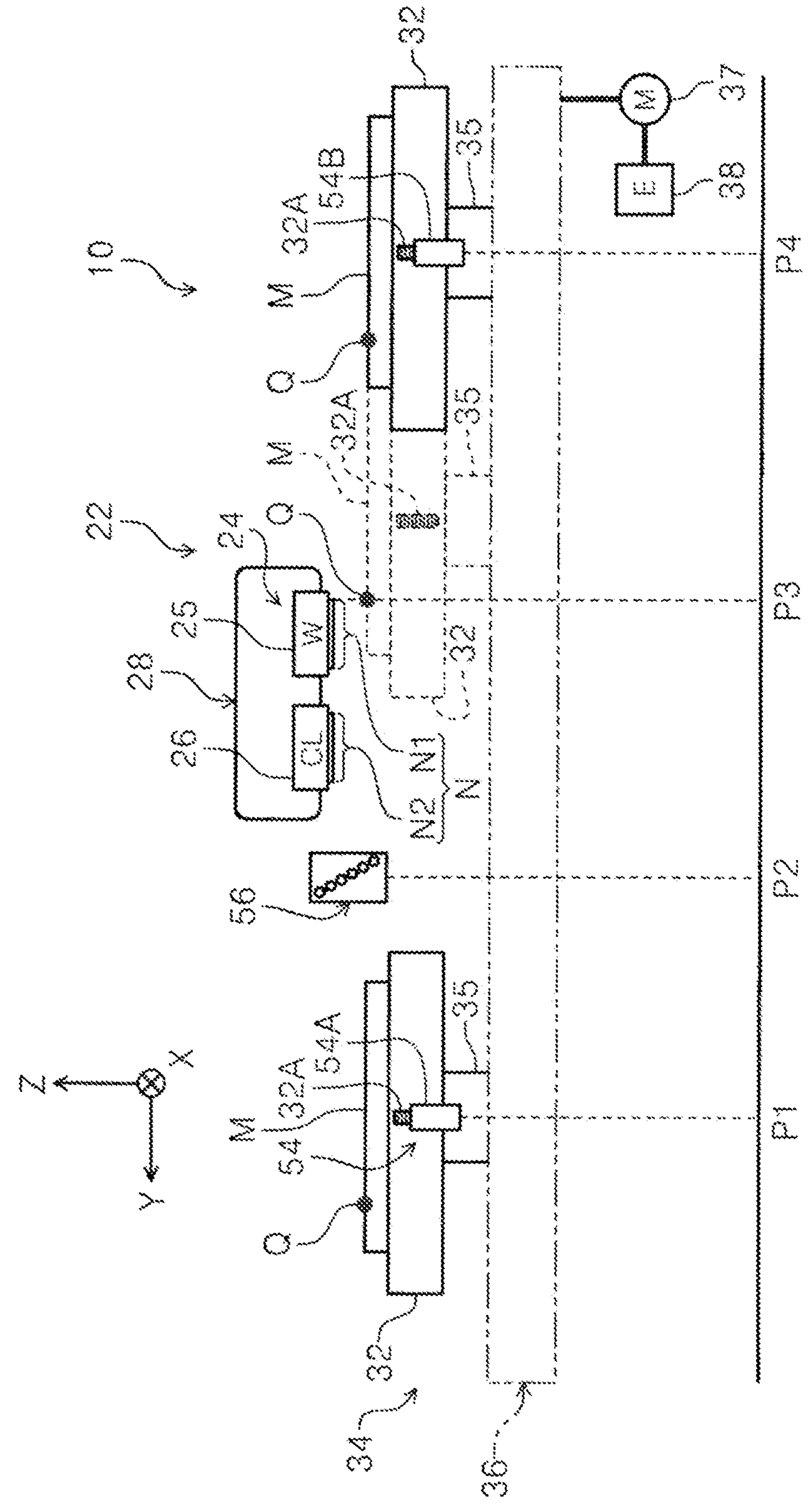
FIG. 2 is an explanatory diagram illustrating a position of each unit of the printing apparatus according to Exemplary Embodiment 1.

The image formation unit 22 illustrated in FIG. 2 is an example of an image forming unit. Further, the image formation unit 22 includes a printing head 24 performing printing (image formation) on the medium M, and a carriage 28 holding the printing head 24. Note that, the carriage 28 is provided so as to be relatively movable in the Z direction with respect to a frame member (not illustrated) provided in the main body unit 12 (FIG. 1).

In FIG. 2, positions P1 to P4 in the Y direction of the respective units in the printing apparatus 10 are illustrated. The position P1 to position P4 are aligned, from upstream to downstream side in the −Y direction, in an order of numbers. Note that, the positions P1 to P4 are schematically illustrated, and an interval between the positions may be different from an actual interval.

The printing head 24 includes a first head 25 as an example of a first forming unit and a second head 26 as an example of a second forming unit. The first head 25 and the second head 26 are each configured, as an example, as a line head that is long in the X direction.

The "line head" means a printing head provided such that a region including nozzles formed in the X direction which intersects with a movement direction of the medium M is capable of covering an entirety of the medium M in the X direction.

In addition, the printing head 24 is disposed on the +Z side with respect to the medium M. In addition, the printing head 24 is configured to discharge ink as an example of liquid toward the −Z side to print on the medium M.

The first head 25 uses an ink of a white color as an example of a first color as a base color or an image formation color to form a first image G1 (FIG. 10) on the medium M. Note that, when a white ink layer is illustrated, the ink layer is indicated by W. The base color means a color of a surface to be printed of the medium M serving as a base. The image formation color means a color required to make an image visible on the medium M.

In the first head 25, a region in which a discharge port of a nozzle is disposed is referred to as a first image forming region N1.

The second head 26 is positioned downstream of the first head 25 in the +Y direction. In other words, the image formation unit 22 is configured such that, after the first image G1 is formed, a second image G2 is formed. Further, the second head 26 uses an ink of a color that is a color different from the white color and that is an example of a second color as an image formation color (at least one of inks corresponding to colors of black, yellow, cyan, and magenta) to form the second image G2 (FIG. 10) on the medium M. Note that, when a color ink layer is illustrated, the ink layer is indicated by CL.

Figure 10:
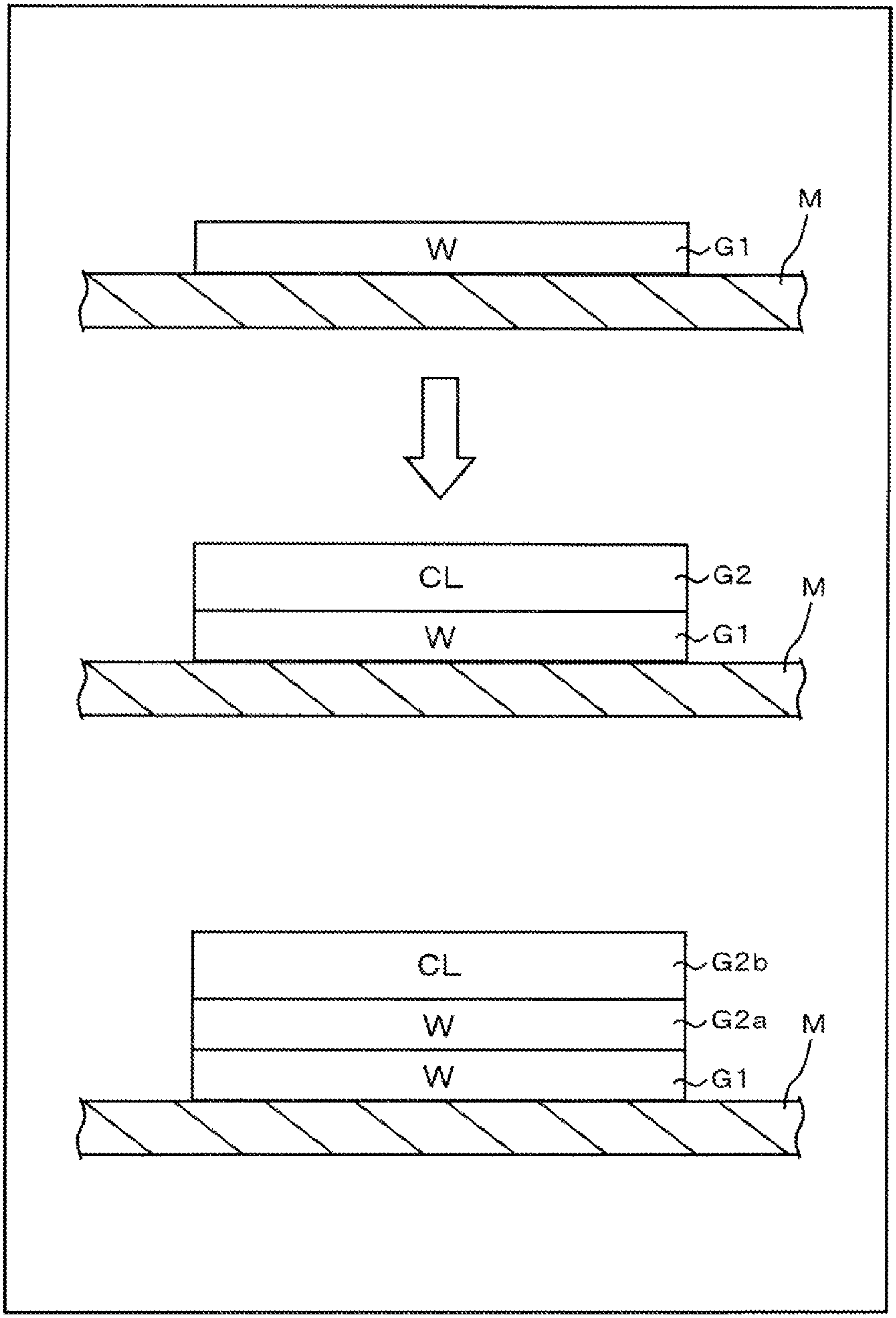
FIG. 10 is a schematic diagram illustrating a state where a first image and a second image are printed on the medium in the printing apparatus according to Exemplary Embodiment 1.

In addition, when the second image G2 is formed in an overlapping manner, a lower layer is referred to as a second image G2*a*, and an upper layer is referred to as a second image G2*b* and are distinguished from each other (FIG. 10).

In the second head 26, a region in which a discharge port of a nozzle is disposed is referred to as a second image forming region N2. The first image forming region N1 and the second image forming region N2 are collectively referred to as an image forming region N of the image formation unit 22.

Tray

The tray 32 is an example of a placement unit, and is formed in a plate shape with the Z direction as a thickness direction. The entire medium M is placed on a surface on the +Z side of the tray 32. Furthermore, a sensed unit 32A is formed at a center site in the Y direction on respective side surfaces at both ends of the tray 32 in the X direction. The sensed unit 32A, as an example, protrudes from the tray 32 toward the +X side and the −X side, and is configured to reflect light from the position sensor 54 described later, toward the position sensor 54.

Movement Unit

The movement unit 34 is an example of a moving unit. Further, the movement unit 34 is configured to include a support pillar 35 supporting a stage (not illustrated), a belt unit 36 moving the support pillar 35 in the −Y direction and the Y direction, a transport motor 37 driving the belt unit 36, and an encoder 38 detecting an amount of rotation of the transport motor 37.

The belt unit 36 is configured to include a belt (not illustrated), a rotating body supporting the belt such that the belt is capable of being circled and moved, and a gear transmitting a driving force to the rotating body.

The transport motor 37 is configured to be rotatable in a forward rotation direction and a reverse rotation direction, and a rotation direction and an amount of rotation of the rotating body are controlled by an instruction from the control unit 40 (FIG. 1) described below. The amount of rotation obtained in the encoder 38 is transmitted to the control unit 40.

The movement unit 34 is configured such that movement thereof is controlled by the control unit 40, and moves the tray 32 in the −Y direction before printing is performed and in the +Y direction when printing is performed. Specifically, the movement unit 34 is provided such that a position of the tray 32 is replaced with a position of the sensed unit 32A, and the tray 32 is movable to a first position (the position P1) when the medium M is placed on the tray 32, and to a second position (the position P4) positioned on a side opposite to the first position (−Y side) with respect to the image formation unit 22 the second position serving as a reference position for movement of the tray 32. The second position is set downstream of the first position in the −Y direction.

Position Sensor

The position sensor 54 includes, as an example, a front sensor 54A disposed on the +Y side of a position of the carriage 28, and a rear sensor 54B disposed on the −Y side. The front sensor 54A is disposed such that the position P1 is a central position. The rear sensor 54B is disposed such that the position P4 is a central position.

The front sensor 54A and the rear sensor 54B are disposed so as to face the sensed unit 32A of the tray 32 in the X direction. Further, each of the front sensor 54A and the rear sensor 54B, as an example, is configured as a reflective sensor having a light emitting unit and a light-receiving unit, and receives reflected light from the sensed unit 32A to sense the position of the tray 32.

Position of Each Unit

In a printing region of the medium M set in advance by the control unit 40 (FIG. 1), a position to be a downstream end in the +Y direction is referred to as a starting position Q of image formation. The starting position Q is the starting position of the image formation on the medium M placed on the tray 32. Note that, in FIG. 2, the starting position Q is indicated by a point Q. A distance between the sensed unit 32A and the starting position Q in the Y direction is set by the control unit 40.

Further, a position at which the height sensor 56 described below is provided is referred to as a sensed position P2. The sensed position P2 corresponds to a central position of the height sensor 56 in the Y direction.

In the first image forming region N1 of the first head 25, an uppermost stream position in the +Y direction is referred to as an image forming position P3. Further, the image forming position P3 is downstream of the sensed position P2 in the −Y direction.

Thus, the image formation unit 22 is configured to, when the starting position Q of the image formation overlaps with the image forming position P3, start printing (image formation) on the medium M. Note that, in the printing apparatus 10, there are error factors such as a stretch of a belt of the belt unit 36 and a backlash of the gear. Thus, in the printing head 24, in a case of overlapping printing in which once the belt unit 36 is stopped after printing, the movement direction is changed, and the printing is performed again, there is a possibility that a position shift of each image may occur, and accuracy of an image may be deteriorated.

Height Sensor

Figure 4:
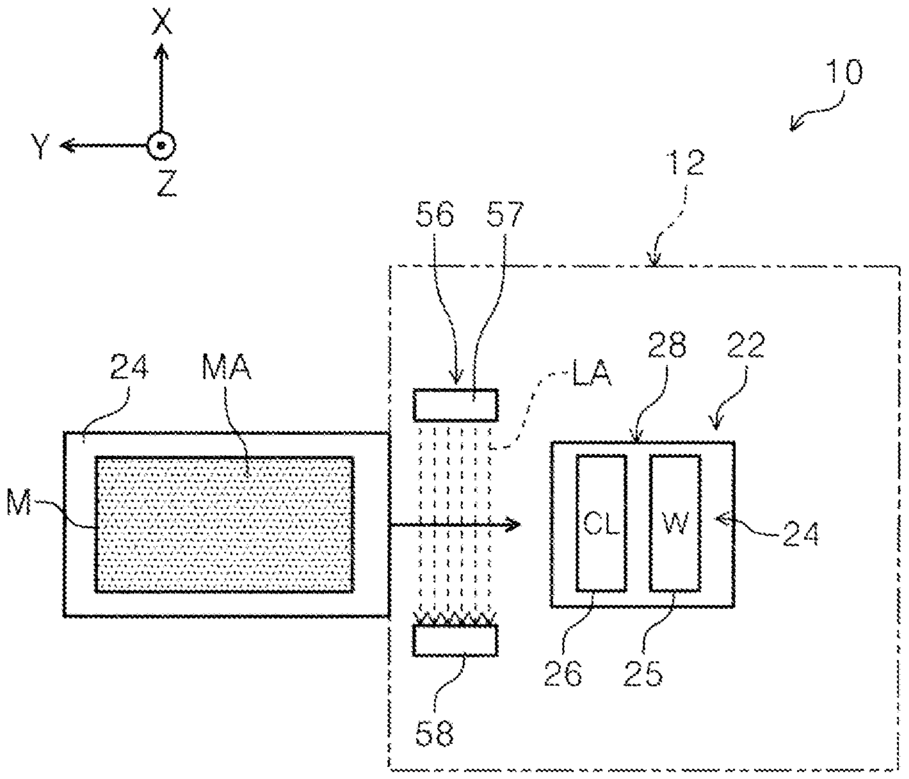
FIG. 4 is a schematic plan view of a main part of the printing apparatus according to Exemplary Embodiment 1.

As illustrated in FIG. 4, the height sensor 56 is constituted by, as an example, an emitting unit 57 emitting light LA, and a light-receiving unit 58 receiving the light LA. The emitting unit 57 is disposed on the +X side with respect to the tray 32. The light-receiving unit 58 is disposed on the −X side with respect to the tray 32. Further, the light-receiving unit 58 includes a plurality of photoreceptor elements 58A (FIG. 5) having different positions in the Z direction respectively.

The height sensor 56 is configured such that, in the movement of the tray 32 in the −Y direction, when a part of the light LA is blocked by the medium M, output of some of the photoreceptor elements 58A decreases to detect a height position of an upper surface MA on the +Z side of the medium M.

Figure 5:
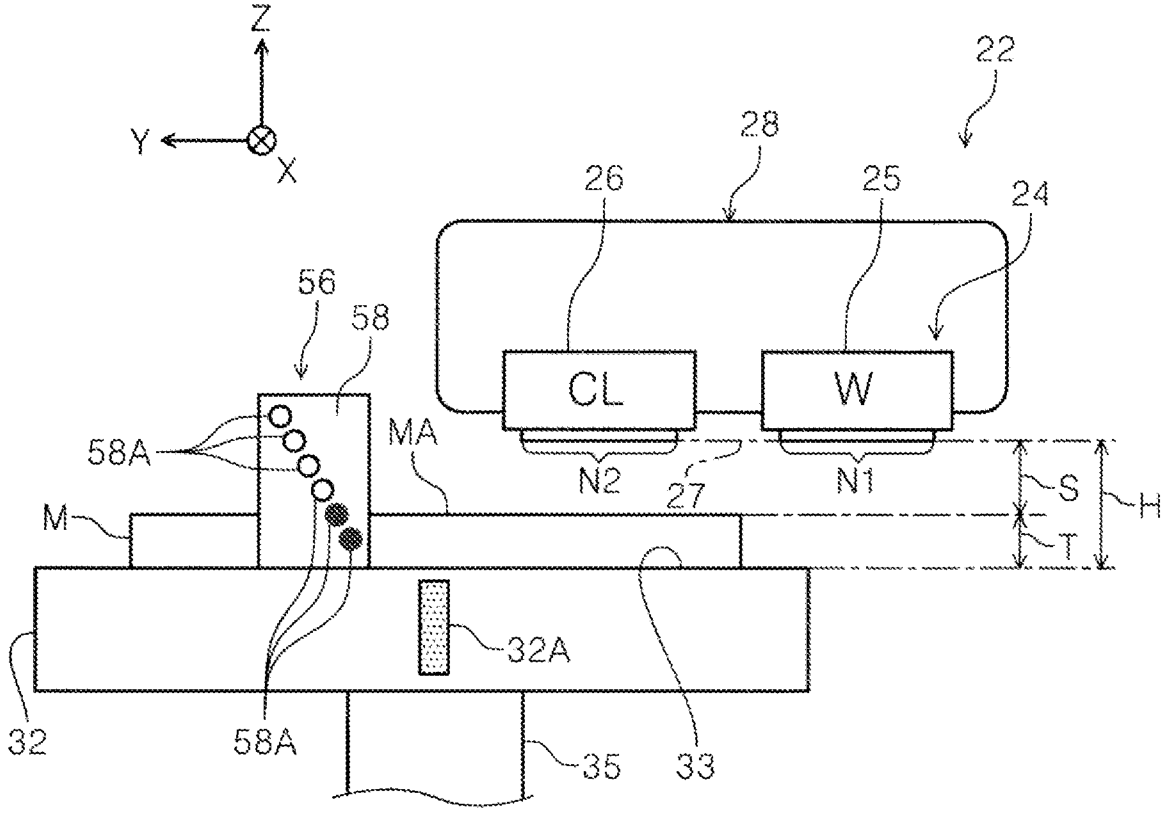
FIG. 5 is a schematic side view illustrating an interval between a medium and a printing head in the printing apparatus according to Exemplary Embodiment 1.

FIG. 5 illustrates a state where the height sensor 56 is used to detect the height position of the upper surface of the medium M. Note that, in FIG. 5, the medium M is schematically in a flat plate shape, but in reality the height of the upper surface of the medium M varies in the Y direction. Additionally, in FIG. 5, among the photoreceptor elements 58A, one that receives light is indicated by a white circle, and one that cannot receive light is indicated by a black circle.

The height position (a height T (mm)) of the upper surface MA of the medium M in the Z direction with respect to an upper surface 33 on the +Z side of the tray 32 is detected by the height sensor 56.

On the other hand, a virtual surface on the −Z side of the printing head 24 (image formation unit 22) is referred to as a lower surface 27. As an example, the lower surface 27 is positioned at an average height of a lower surface of the first head 25 and a lower surface of the second head 26. A height position (height H (mm)) in the Z direction of the lower surface 27 with respect to the upper surface 33 can be changed by driving the carriage motor 52 (FIG. 3) described above.

Here, an interval S (mm) between the upper surface MA and the lower surface 27 is determined by a relational expression S=H−T. In other words, after the height T of the upper surface MA is determined using the height sensor 56, the interval S can be changed by driving the carriage motor 52 to change the height H of the lower surface 27.

Control Unit

Figure 3:
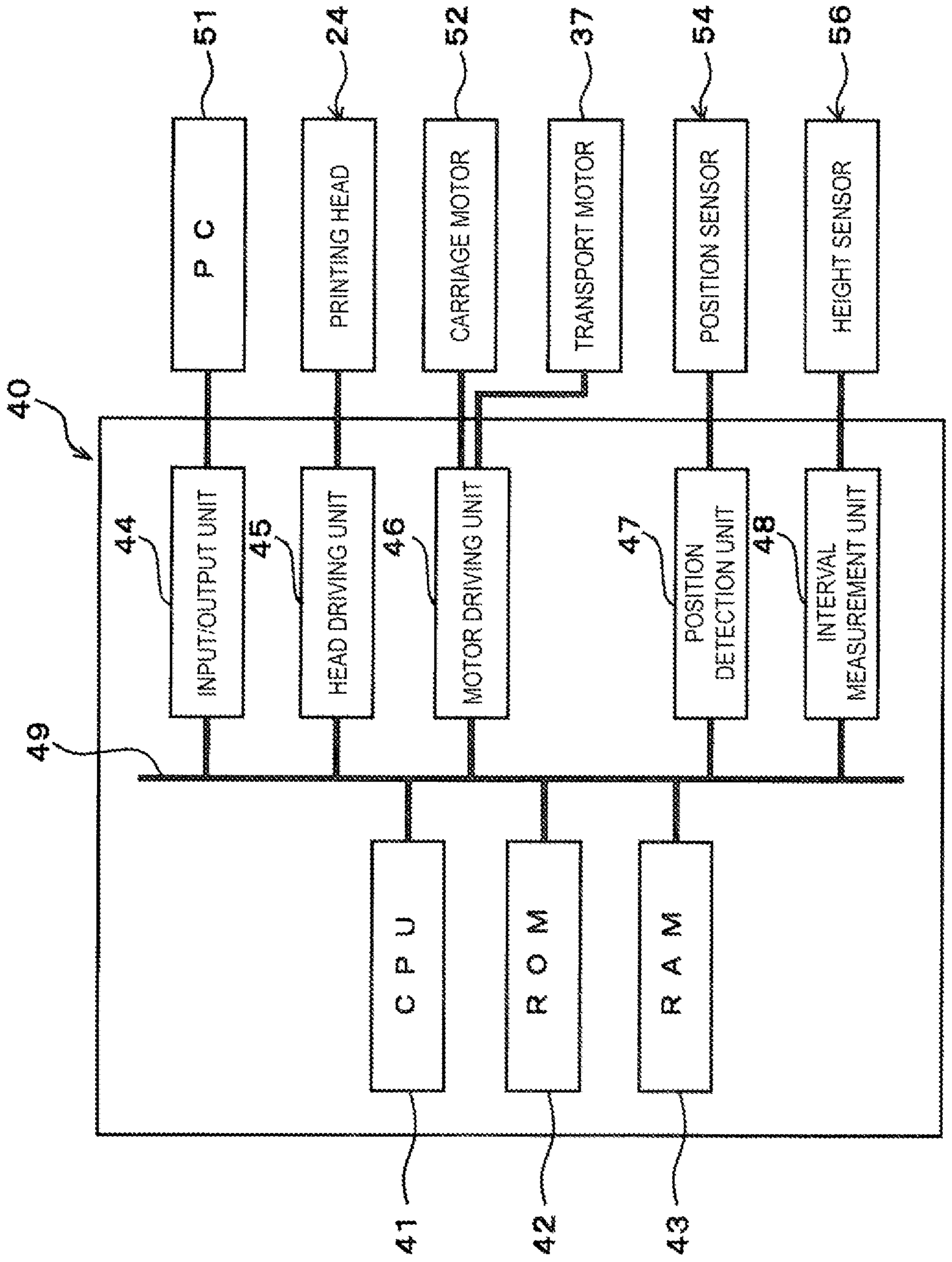
FIG. 3 is a block diagram of the printing apparatus according to Exemplary Embodiment 1.

The control unit 40 illustrated in FIG. 3 is provided with, as an example, a central processing unit (CPU) 41, a read only memory (ROM) 42, a random access memory (RAM) 43, a storage (not illustrated), an input/output unit 44, a head driving unit 45, a motor drive unit 46, a position detection unit 47, an interval measurement unit 48, and a bus 49. Note that, in the description of the control unit 40, descriptions of individual figure numbers are omitted for each of the members and sites illustrated in FIGS. 1, 2, 4, and 5.

The CPU 41 is coupled to the ROM 42, the RAM 43, the storage, the input/output unit 44, the head driving unit 45, the motor driving unit 46, the position detection unit 47, and interval measurement unit 48 via the bus 49.

The input/output unit 44 receives setting information and instruction information transmitted from a personal computer (PC) 51 as an example of an external input device, and communicates the information to the CPU 41. Note that, in the PC 51, one of a first mode and a second mode described later is selected.

The head driving unit 45, based on an instruction from the CPU 41, drives the printing head 24.

The motor driving unit 46, based on an instruction from the CPU 41, drives the transport motor 37 and the carriage motor 52. The carriage motor 52 drives the carriage 28 in the Z direction to change the position of the carriage 28 in the Z direction.

The position detection unit 47 converts information transmitted from the position sensor 54 into positional information in the Y direction of the tray 32 and the medium M to detect a position of the starting position Q. Position information of the starting position Q is transmitted to the CPU 41.

The interval measurement unit 48 is an example of a measurement unit, and, based on information transmitted from the height sensor 56, measures the interval S between the medium M and the image formation unit 22 (printing head 24). Information about the interval S is transmitted to the CPU 41.

The control unit 40 controls the movement of the tray 32 by the movement unit 34 and the printing (image formation) by the image formation unit 22. Specifically, the control unit 40 is configured to, based on a print program set in advance, switch, based on input information from the PC 51, between a first mode for improving productivity and a second mode for improving print quality (image position accuracy), and perform the mode.

In the first mode, the control unit 40 moves the starting position Q from the first position (position P1) to the image forming region N in the −Y direction, and does not move the tray 32 to the second position (position P4), changes a movement direction of the tray 32 from the −Y direction to the +Y direction, and forms the first image G1 and the second image G2 (FIG. 10) on the medium M during one move in the +Y direction. In other words, in the first mode, the control unit 40, after forming the first image G1 on the medium M, without changing the movement direction of the tray 32, forms the second image G2 on the medium M.

Note that, the control unit 40, in the first mode, can also form the first image G1 while moving the tray 32 in the +Y direction, then move the tray 32 in the −Y direction, further change the movement direction of the tray 32 from the −Y direction to the +Y direction, and form the second image G2 on the medium M while moving the tray 32 in the +Y direction. That is, the control unit 40, in the first mode, after forming the first image G1 and before forming the second image G2, can switch whether to change the movement direction of the tray 32 or not to change the movement direction of the tray 32, and perform according to a result thereof.

The control unit 40, in the second mode, after forming the first image G1 on the medium M, and after moving the tray 32 from the first position to the second position, changes the movement direction of the tray 32 from the −Y direction to the +Y direction and forms the second image G2 on the medium M.

Adjustment Unit

Figure 6:
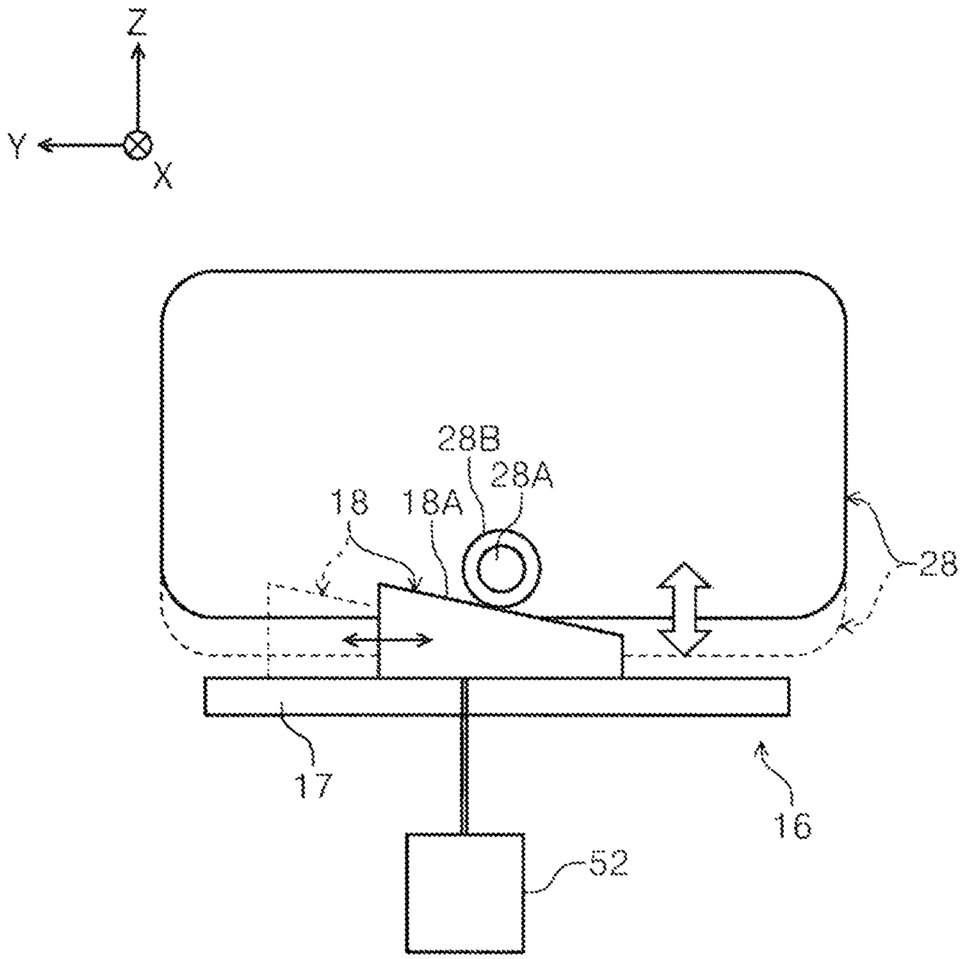
FIG. 6 is a schematic side view illustrating a movement mechanism unit for moving a carriage of the printing apparatus according to Exemplary Embodiment 1 up and down.

Adjustment units 16 are provided as an example of an adjustment unit, on both end portions in the X direction of the carriage 28 illustrated in FIG. 6, respectively. The adjustment unit 16 is supported by a member (not illustrated) provided inside the main body unit 12 (FIG. 1).

The adjustment unit 16 includes, as an example, a base plate 17, a slide member 18, and the carriage motor 52, for adjusting a height position of the carriage 28 in the Z direction. Note that, shaft portions 28A extending in the X direction are formed at both the end portions in the X direction of the carriage 28, respectively. An annular member 28B that is rotatable relative to the shaft portion 28A is provided on the shaft portion 28A.

The base plates 17 are disposed on both outer sides in the X direction of the carriage 28, respectively.

The slide member 18 is slidably provided in the Y direction with respect to the base plate 17. At the slide member 18, an inclined surface 18A extending in an oblique direction intersecting with the Y direction when viewed from the X direction is formed. An outer circumferential surface of the annular member 28B is in contact with the inclined surface 18A.

The carriage motor 52 is configured to, via a conversion mechanism that converts rotational motion into translational motion, drive the slide member 18 in the Y direction. Furthermore, the carriage motor 52 drives the slide member 18 in the Y direction, to make it possible to change a height in the Z direction of the carriage 28.

In this way, the adjustment unit 16 moves the image formation unit 22 (printing head 24) such that a value measured by the interval measurement unit 48 is a set value, to adjust the interval between the medium M and the image forming unit 22. Note that, the control unit 40 operates the adjustment unit 16 between the position P1 and the image forming position P3 described above.

Timing Chart

Figure 7:
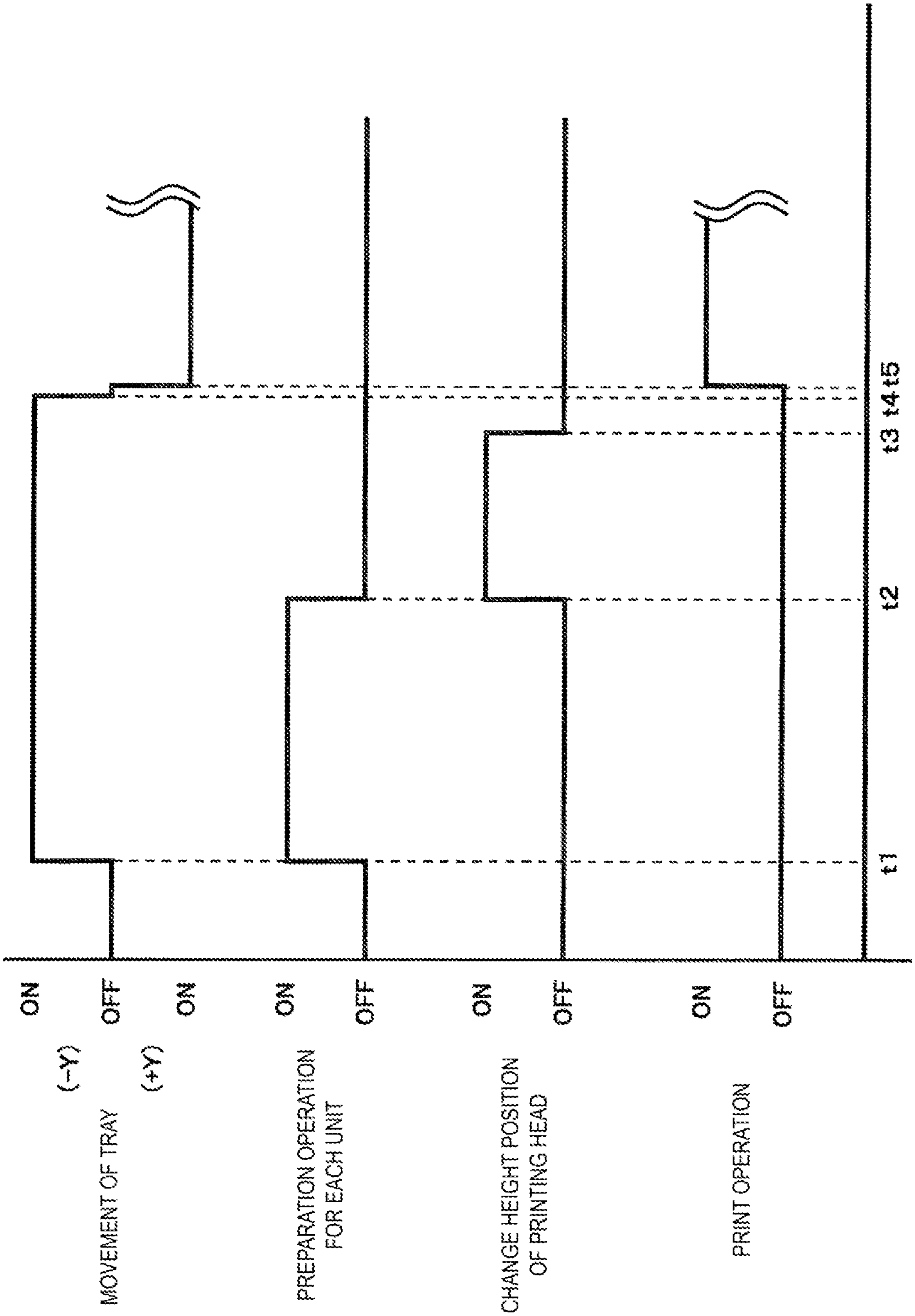
FIG. 7 is a timing chart illustrating an operating state of each unit of the printing apparatus according to Exemplary Embodiment 1.

FIG. 7 illustrates a timing chart of ON and OFF for an example of the movement of the tray 32 (FIG. 1), the preparation operation of each unit of the printing apparatus 10 (FIG. 1), the height position change of the printing head 24 (FIG. 2), and the printing operation. In FIG. 7, time points t1, t2, t3, t4, t5 (*s*) are illustrated, but intervals between t1, t2, t3, t4, and t5 are illustrated schematically, and may be different compared to actual operations.

Note that, for the movement of the tray 32, an operation of a case where, after the tray 32 is moved in the −Y direction, the movement direction is changed, and the tray 32 is moved in the +Y direction is illustrated.

For the preparation operation of each unit of the printing apparatus 10, and the height position change of the printing head 24, an operation when the tray 32 is moved in the −Y direction is illustrated.

For the printing operation, an operation is illustrated when the tray 32 is moved in the +Y direction.

For the movement of the tray 32 in the −Y direction, the movement is started at the time point t1 and the movement is ended at the time point t4. Furthermore, setting is made for starting the movement of the tray 32 in the +Y direction at the time point t5, and stopping the movement at a time point (not illustrated) after the time point t5.

For the preparation operation of each unit of the printing apparatus 10 (for example, an operational check of each sensor, or the like), setting is made for starting the preparation operation at the time point t1, and ending the preparation operation ended at the time point t2. For the height position change of the printing head 24, setting is made for starting the change at the time point t2 and ending the change at the time point t3.

For the printing operation, setting is made for starting the printing operation at the time point t5, and ending the printing operation at a time point (not illustrated) after the time point t5.

Note that, an interval from the time point t4 to the time point t5 may be zero. That is, the printing operation may be started at the same time that the movement of the tray 32 in the −Y direction is ended.

Description on Operations and Effects of Exemplary Embodiment 1

Figure 8:
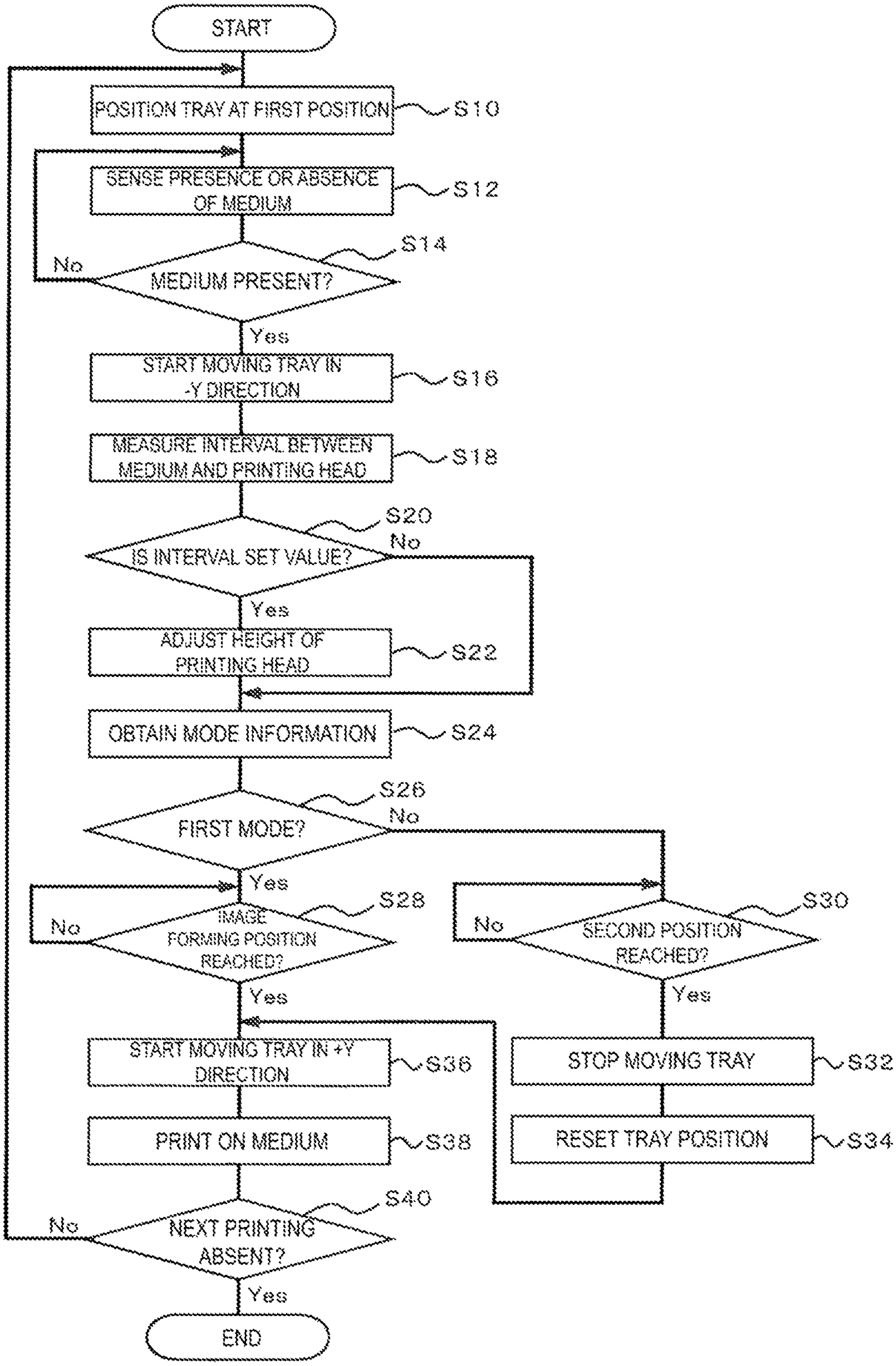
FIG. 8 is a flowchart illustrating a flow of printing performed in the printing apparatus according to Exemplary Embodiment 1.
Figure 9:
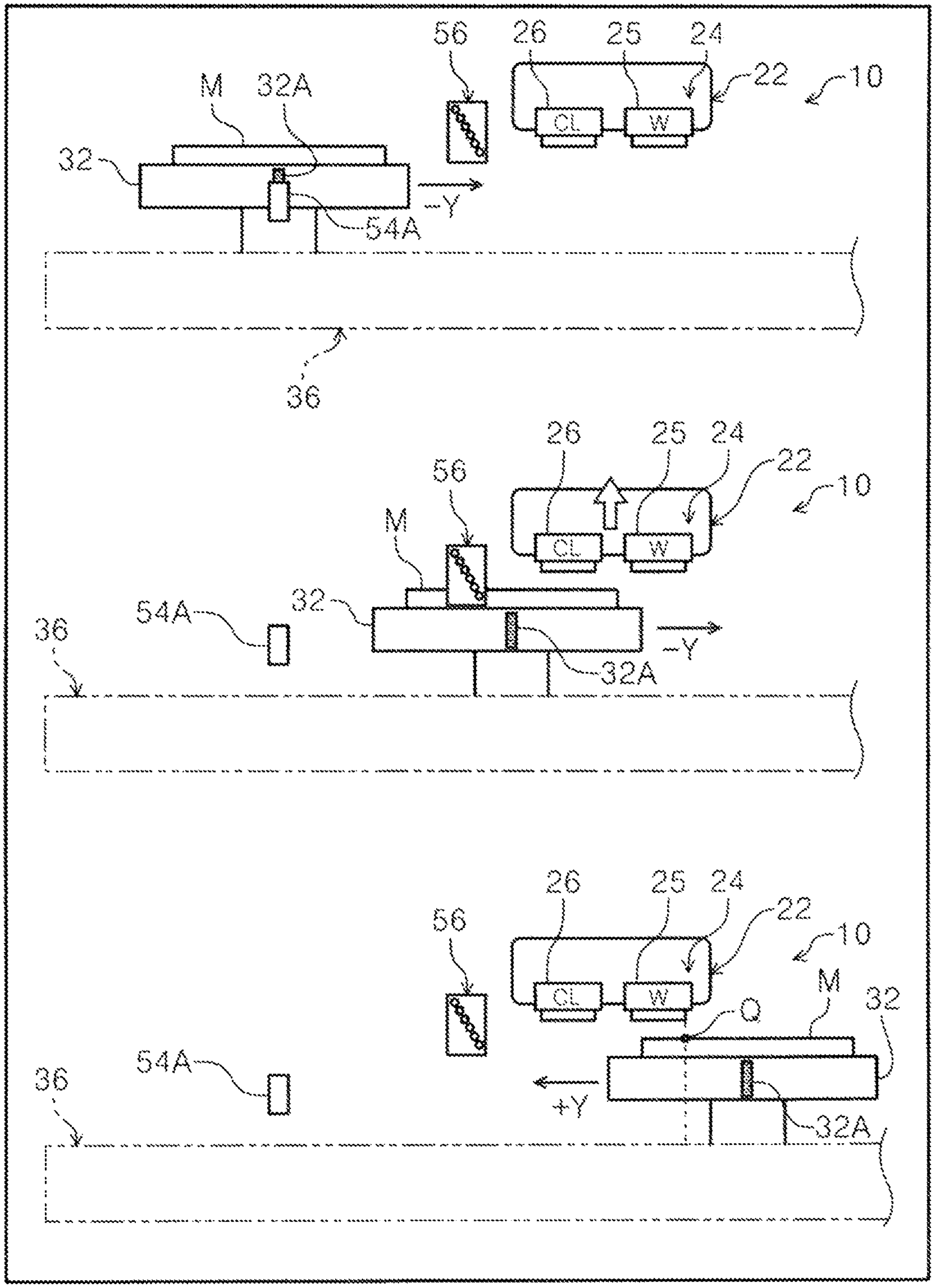
FIG. 9 is a schematic diagram illustrating a state where an interval between the carriage and the medium of the printing apparatus according to Exemplary Embodiment 1 is adjusted.

The printing apparatus 10 and the printing method according to Exemplary Embodiment 1 will be described mainly using FIGS. 8, 9, and 10. FIG. 8 is a flowchart illustrating a flow of printing processing by the control unit 40 (FIG. 3). FIG. 9 is a schematic diagram illustrating the movement of the tray 32, the adjustment of the interval S (FIG. 5), and a printing start state. FIG. 10 is a schematic diagram illustrating a state where the first image G1 and the second image G2 are overlapped and printed on the medium M. Note that, in a description using FIG. 8, when referring to FIGS. 1 to 7, descriptions of the figure numbers are omitted. When FIG. 9 is referred, the reference to FIG. 9 is described.

Each process illustrated in FIG. 8 is performed by the CPU 41 reading a processing program from the ROM 42 or the storage and decompressing the program in the RAM 43, and executing the program.

In step S10, the tray 32 is disposed at the first position (position P1) according to a directive from the CPU 41. The medium M is placed on the tray 32 by a user. At this time, the printing head 24 is positioned at a preset initial position. Then, the processing proceeds to step S12.

In step S12, the CPU 41 uses a sensor (not illustrated) to sense presence or absence of the medium M on the tray 32. Then, the processing proceeds to step S14.

In step S14, the CPU 41 determines the presence or absence of the medium M based on a sensing result. When the medium M is absent, the processing proceeds to step S12. At this time, a liquid crystal panel or the like (not illustrated) is used to notify of the absence of the medium M. On the other hand, when the medium M is present, the processing proceeds to step S16.

In step S16, the CPU 41 operates the movement unit 34 to start the movement of the tray 32 in the −Y direction (top view in FIG. 9). Then, the processing proceeds to step S18.

In step S18, the CPU 41 uses the interval measurement unit 48 to measure the interval S between the medium M and the printing head 24. Then, the processing proceeds to step S20.

In step S20, the CPU 41 determines whether the interval S is set to the set value or not. When the interval S is set to the set value, then the processing proceeds to step S22. On the other hand, when the interval S is a value different from the set value, the processing proceeds to step S24.

In step S22, the CPU 41 uses the adjustment unit 16 and the motor driving unit 46 to adjust the height of the printing head 24 such that the interval S is within a set range (middle view in FIG. 9). Then, the processing proceeds to step S24.

In step S24, the CPU 41 obtains mode information of the printing apparatus 10 (a productivity up mode or a mode for improving print quality). The mode information is obtained from the PC 51, as an example. Then, the processing proceeds to step S26.

In step S26, the CPU 41 determines whether the mode is the first mode or not. When the mode is the first mode, the processing proceeds to step S28. On the other hand, when the mode is the second mode, the processing proceeds to step S30.

In step S28, the CPU 41 determines whether the tray 32 reaches the image forming position P3 or not. When the tray 32 reaches the image forming position P3, the processing proceeds to step S36. On the other hand, when the tray 32 does not reach the image forming position P3, step S28 is repeated.

In step S30, the CPU 41 determines whether the tray 32 reaches the second position (position P4) or not. When the tray 32 reaches the second position, the processing proceeds to step S32. On the other hand, when the tray 32 does not reach the second position, step S30 is repeated.

In step S32, the CPU 41 stops moving the tray 32. Next, the processing proceeds to step S34.

In step S34, the CPU 41 resets the position of the tray 32 (performing origin adjustment). The origin adjustment means an adjustment operation for reversely rotating the transport motor 37 within a set range in order to resolve backlash of the gear. Then, the processing proceeds to step S36. In step S36, the CPU 41 starts the movement of the tray 32 in the +Y direction (bottom view in FIG. 9). Then, the processing proceeds to step S38.

In step S38, the CPU 41 operates the head driving unit 45 based on preset information in accordance with the start of the movement of the tray 32 in the +Y direction, and performs printing of the first image G1 and the second image G2 on the medium M. Note that, the printing of the first image G1 and the second image G2 on the medium M will be described later. Then, the processing proceeds to step S40.

In step S40, the CPU 41 determines presence or absence of the next printing based on information inputted from the PC 51. When printing is absent, the processing program is ended. On the other hand, when printing is present, the processing proceeds to step S10.

As illustrated in FIG. 2, in the +Y direction, the first head 25 is positioned upstream of the second head 26. Then, the first head 25 and the second head 26 are aligned in the +Y direction.

Thus, as illustrated in a top view and a middle view in FIG. 10, after the first image G1 is printed, the second image G2 is formed on the first image G1 in an overlapping manner on the medium M.

Note that, as illustrated in a bottom view in FIG. 10, in the first mode or the second mode, after the first image G is printed, the printing head 24 (FIG. 2) may be returned to the second position, and then the second image G2*a* and the second image G2*b* may be printed again. When the second image G2 is formed in an overlapping manner, after the second image G2*a* is printed, the printing head 24 (FIG. 2) may be returned to the second position and then the second image G2*b* may be printed.

(1) As described above, according to Exemplary Embodiment 1, the control unit 40, in the first mode, moves the starting position Q of the image formation on the medium M placed on the tray 32 from the first position to the image forming region N of the image formation unit 22 in the −Y direction, and does not move the tray 32 to the second position, changes the movement direction of the tray 32 from the −Y direction to the +Y direction, and while moving the tray 32 in the +Y direction forms the first image G1 and the second image G2 on the medium M. Accordingly, the tray 32 is not moved to the second position, which eliminates a need for a time for movement thereof and productivity of the printing can be improved. Furthermore, a distance of movement for moving the tray 32 until the movement in the −Y direction is changed to the movement in the +Y direction is determined based on the starting position Q of the image formation on the medium M, and thus a distance of movement of the tray 32 in the first mode can be reduced, and thus the productivity of the printing can be improved.

On the other hand, in the second mode, the control unit 40 moves the tray 32 to the second position, and changes the movement direction of the tray 32 from the −Y direction to the +Y direction to form the second image G2 on the medium M. Accordingly, the second position serves as a reference position for calibrating a position of the tray 32, and the first image G1 and the second image G2 are overlapped each other based on the reference position, thus a position shift of an arrangement of the second image G2 with respect to the first image G1 can be suppressed, and thus a high-quality image can be formed. Further, the position shift of the arrangement of the first image G1 and the second image G2 with respect to the medium M can be suppressed, and thus a high-quality image can be formed.

Note that, in the second mode, after the first image G1 is formed, instead of moving the tray 32 from the first position to the second position, the tray 32 may be moved from any position downstream of the first position in the −Y direction to the second position. That is, as far as the tray 32 can be moved to the second position, a starting position before the tray 32 reaches the second position may be anywhere.

(2) According to the Exemplary Embodiment 1, the control unit 40, in the first mode, after forming the first image G1 on the medium M, without changing the movement direction, forms the second image G2 on the medium M. Accordingly, compared to a configuration in which, after the first image G1 is formed on the medium M, the tray 32 is returned to the second position and then the second image G2 is formed on the medium M, a position shift of the image formation associated with switching of the movement direction of the tray 32 is less likely to occur, thus it is possible to suppress a position shift of the arrangement of the second image G2 with respect to the first image G1.

(3) The first image G1 is formed in the white color as the first color, and the second image G2 is formed in the white color, and the color other than the white color as the second color. In other words, the first image G1 is constituted by a W layer, and the second image G2 is constituted by a W layer and a CL layer. Further, the first head 25 is fixed in a state of positioned upstream of the second head 26, thus in the second image G2, an image formed in the white color and an image formed in the color other than the white color do not shift in position from each other. However, when a drying rate of an ink corresponding to the white color is different from a drying rate of an ink corresponding to the color other than the white color, in second image G2, the W layer and the CL layer may be blended. According to Exemplary Embodiment 1, the second image G2*a* in the white color is formed on the medium M upstream in the +Y direction, and after the second image G2*a* dries, the second image G2*b* is formed in the color different from the white color downstream in the +Y direction, thus it is possible to suppress blending of the white color and the other colors in the second image G2.

Furthermore, when the second image G2 is formed in an overlapping manner, the second image G2*a* and the second image G2*b* can be formed while the tray 32 is moved in the +Y direction, thus, in addition to the above, productivity of image formation (three-layer printing) with the first image G1, the second image G2*a*, and the second image G2*b* can be improved.

(4) According to Exemplary Embodiment 1, while the tray 32 is moved from the first position to the image forming position P3, the interval measurement unit 48 measures the interval S between the medium M and the image formation unit 22 (printing head 24). Then, the adjustment unit 16 moves the image formation unit 22 in the Z direction such that a value of the interval S measured by the interval measurement unit 48 is the set value.

In this way, while the tray 32 is moved from the first position to the image forming position P3, the interval S between the medium M and the image formation unit 22 is adjusted, thus as compared to a configuration in which the interval S between the medium M and the image formation unit 22 is adjusted after the tray 32 reaches the second position, an elapsed time from the movement start time point of the tray 32 to the printing start time point can be shortened.

Exemplary Embodiment 2

Next, Exemplary Embodiment 2 will be described as an example of the printing apparatus and the printing method according to the present disclosure. Note that, components common to Exemplary Embodiment 1 are referenced using like numbers, descriptions thereof will be omitted. Furthermore, similar operations and effects to those of Exemplary Embodiment 1 will also be omitted.

Figure 11:
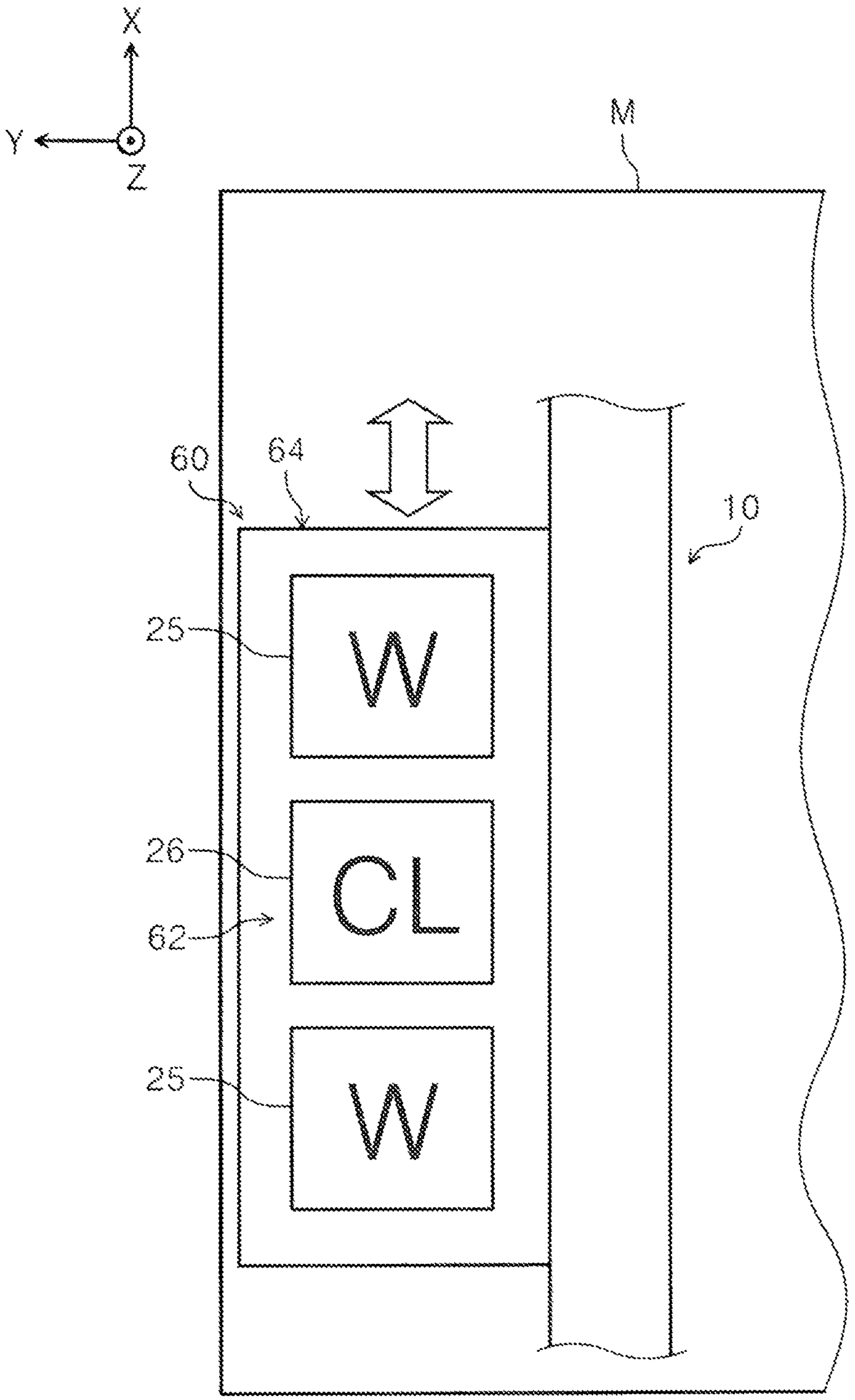
FIG. 11 is a schematic plan view illustrating an arrangement of heads of a printing apparatus according to Exemplary Embodiment 2.

As illustrated in FIG. 11, in the printing apparatus 10, an image formation unit 60 may be used instead of the image formation unit 22 (FIG. 2).

The image formation unit 60 is configured to be movable in the X direction as an example of a scanning direction that intersects with the −Y direction and the +Y direction using a motor or the like (not illustrated). Specifically, the image formation unit 60 includes a printing head 62 performing printing (image formation) on the medium M, and a carriage 64 holding the printing head 62 such that the printing head 62 is movable in the X direction.

The printing head 62 includes, as an example, two number of the first heads 25 and one number of the second head 26. One number of the first head 25 is positioned on each of one side (+X side) and another side (−X side) of the second head 26 in the X direction. In other words, the second head 26 is sandwiched between the two first heads 25 in the X direction. In this way, the printing head 62 is configured as a serial head, and is disposed on the +Z side with respect to the medium M.

The "serial head" means a printing head that reciprocates over medium M to form an image.

In addition, the printing head 62 is configured to discharge ink as an example of liquid toward the −Z side to print on the medium M.

Description of Operations and Effectiveness of Exemplary Embodiment 2

(1) According to Exemplary Embodiment 2, since the first head 25 and the second head 26 are positioned at an identical position in the +Y direction when viewed from the X direction, the image formation unit 60 can be made smaller in the +Y direction.

Furthermore, even when the image formation unit 60 is moved to any of one side and another side in the X direction, after the first image G1 (FIG. 10) is formed by the first head 25, the second image G2 (FIG. 10) is formed by the second head 26. Thus, in a case where the second image G2 is overlapped on the first image G1, even when the image formation unit 60 is configured as a serial head, the image formation unit 60 can be moved to either the one side or the other side in the X direction, and the image formation unit 60 is not required to return to an origin position in the X direction each time, thereby improving the productivity of the printing.

Other Exemplary Embodiments

The printing apparatus 10 and the printing method according to the exemplary embodiments of the present disclosure are based on the configuration and the method described above. However, as a matter of course, modifications, omission, and the like may be made to a partial configuration without departing from the gist of the disclosure of the present application.

Figure 12:
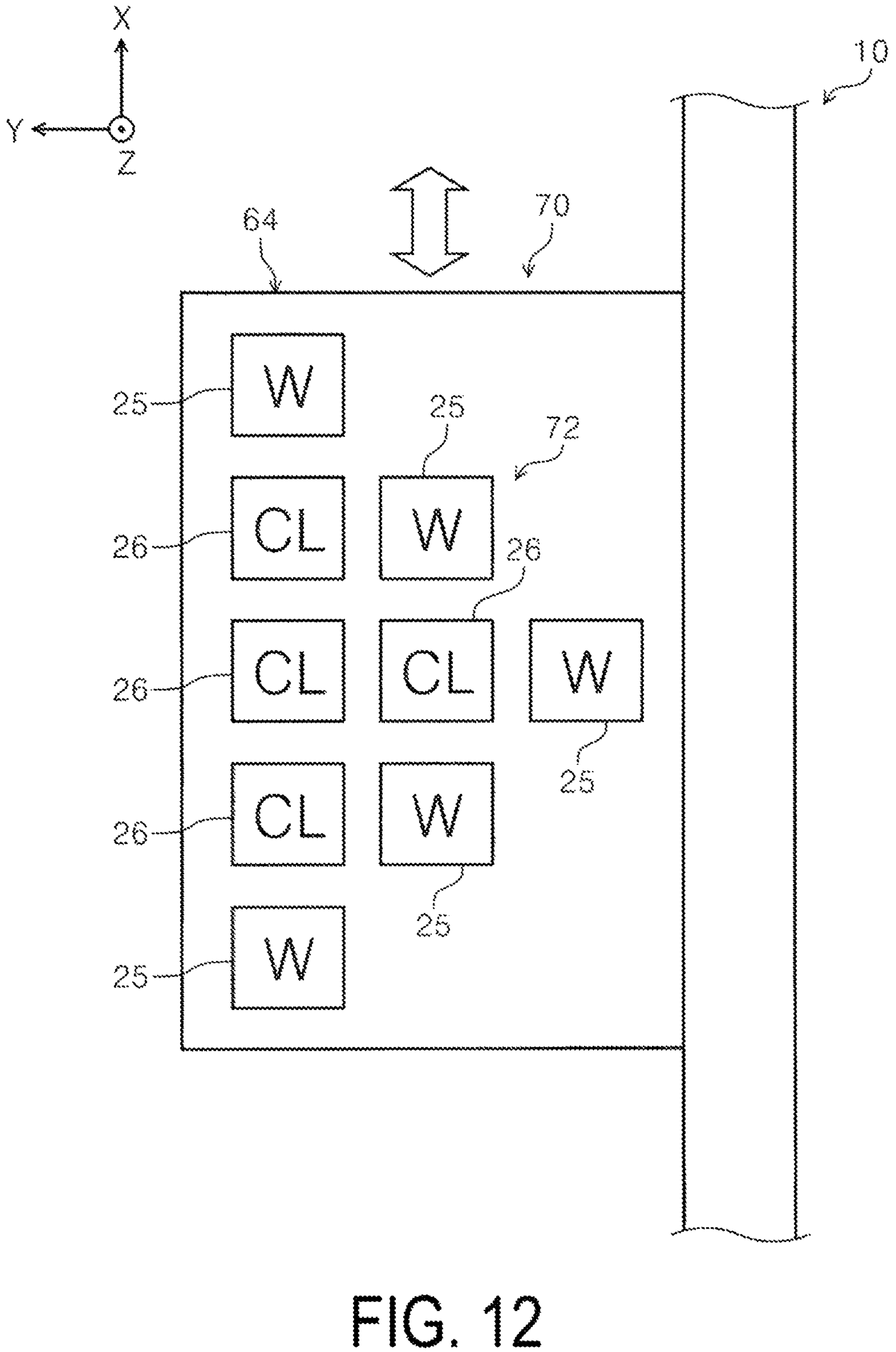
FIG. 12 is a schematic plan view illustrating an arrangement of heads of a printing apparatus according to a modified example of Exemplary Embodiment 2.

FIG. 12 illustrates an image formation unit 70 as a modified example of the image formation unit 60 (FIG. 11) of Exemplary Embodiment 2. Note that, an identical configuration to the image formation unit 60 will be given an identical reference numeral and description will be omitted.

The image formation unit 70 is configured to be movable in the X direction using a motor or the like (not illustrated).

Specifically, the image formation unit 70 includes a printing head 72 performing printing (image formation) on the medium M, and the carriage 64.

As an example, the printing head 72 includes five number of the first heads 25 and four number of the second heads 26, and the printing heads are disposed in three separate lines. Note that, the lines are referred to as a first line, a second line, and a third line in order from upstream in the +Y direction.

In the first line, one number of the first head 25 is disposed.

In the second line, one number of the second head 26 aligned in the Y direction with the first head 25 in the first line, and one number of the first head 25 positioned on each of the +X side and the −X side with respect to this second head 26 is disposed.

In the third line, two number of the first heads 25 and three number of the second heads 26 are disposed. One number of the first head 25 is positioned on each of the +X side and the −X side with respect to the three second heads 26. Two of the three second heads 26 are aligned in the Y direction with the first head 25 in the second line. The remaining one second head 26 is aligned in the Y direction with the second head 26 in the second line.

As described above, a configuration may be adopted in which, in any of the X direction and the Y direction, after an image is formed using the first head 25, an image is formed using the second head 26. In other words, the image formation unit 70 can perform printing with either a serial head or line head.

The printing apparatus 10 is not limited to an ink-jet type, and may be an electrophotographic type. Additionally, the printing apparatus 10 is not limited to one that moves the medium M in the Y direction (horizontal direction), and may be one that moves the medium M in the Z direction (vertical direction).

In addition, the printing apparatus 10 is not limited to one that switches between the first mode and the second mode in the PC 51, the printing apparatus 10 may be provided with a selection button as an example of a selection unit (operation unit) and a user is caused to select the selection button, or a configuration may be adopted in which a selection button as an example of a selection unit is displayed on a touch panel provided on the printing apparatus 10 and the user is caused to select the selection button.

In the printing apparatus 10, the first color is not limited to the white color, and other colors may be used in accordance with the color of a front surface of the medium M. In addition, the medium M, for which printing using the white color is already ended, may be placed and fixed on the tray 32, and printing may be performed.

In addition, in the printing apparatus 10, when the interval S is adjusted, the tray 32 may be moved in the Z direction without moving the image formation unit 22.

The height sensor 56 may be positioned, rather than between the first position and the image forming position P3, in the first position or the second position.

As another example of the printing apparatus 10, it is also possible to perform only the first mode (the mode for improving productivity). That is, without setting the second position, the tray 32 may be moved from the first position to the image forming position P3, and then the movement direction of the tray 32 may be changed, and printing may be performed while the tray 32 is moved toward the first position.

What is claimed is:

1. A printing apparatus, comprising:

an image forming unit including a first forming head configured to form a first image on a medium using a first color, and a second forming head configured to form a second image on the medium using a second color different from the first color;

a placement tray on which the medium is placed;

a moving device configured to move the placement tray in a first direction before image formation is performed, and to move the placement tray in a second direction opposite to the first direction when image formation is performed; and a control unit configured to control the movement of the placement tray by the moving device and the image formation by the image forming unit, wherein the moving device is configured to move the placement tray to a first position at which the medium is placed on the placement tray, and to a second position positioned on a side opposite to the first position in the second direction with respect to the image forming unit, the second position serving as a reference position for the movement of the placement tray, and the control unit receives mode information from a source external to the printing apparatus, the mode information indicating a first mode which is configured to increase an amount of image formation performed by the printing apparatus and a second mode which is configured to increase a quality of the image formation performed by the printing apparatus, the control unit executes switching between the first mode for moving, in the first direction, a starting position of the image formation on the medium placed on the placement tray from the first position to an image forming region of the image forming unit, and changing a movement direction of the placement tray from the first direction to the second direction without moving the placement unit to the second position, and forming the first image and the second image on the medium while moving the placement tray in the second direction, and the second mode for, after forming the first image, moving the placement tray to the second position, changing the movement direction from the first direction to the second direction, and forming the second image on the medium.

2. The printing apparatus according to claim 1, wherein the control unit, in the first mode, forms the second image on the medium without changing the movement direction after forming the first image on the medium.

3. The printing apparatus according to claim 1, wherein the first image is formed in a white color as the first color, the second image is formed in the white color and a color other than the white color as the second color, and the second forming head is positioned downstream of the first forming head in the second direction.

4. The printing apparatus according to claim 1, wherein the image forming unit is configured to move in a scanning direction intersecting with the first direction and the second direction, and the first forming head is positioned on one side and another side of the second forming head in the scanning direction.

5. The printing apparatus according to claim 1, comprising:

a measurement device configured to measure an interval between the medium and the image forming unit; and an adjustment device configured to adjust the interval between the medium and the image forming unit by moving the image forming unit or the placement tray such that a value measured by the measuring device is a set value, wherein the control unit causes the adjustment device to operate between the first position and the second position.

6. A printing method for a printing apparatus that includes an image forming unit including a first forming head configured to form a first image on a medium, and a second forming head configured to form a second image on the medium, a placement tray on which the medium is placed, and a moving device configured to move the placement tray in a first direction before image formation is performed, and to move the placement tray in a second direction opposite to the first direction when image formation is performed, and the moving device is configured to move the placement tray to a first position at which the medium is placed on the placement tray, and to a second position positioned on a side opposite to the first position in the second direction with respect to the image forming unit, the second position serving as a reference position for the movement of the placement tray, wherein the method comprising:

receiving mode information from a source external to the printing apparatus, the mode information indicating a first mode which is configured to increase an amount of image formation performed by the printing apparatus and a second mode which is configured to increase a quality of the image formation performed by a printing apparatus;

executing the first mode by moving a starting position of the image formation on the medium placed on the placement tray, in the first direction, from the first position past an image forming region of the image forming unit, and changing the first direction to the second direction without moving the placement tray to the second position, and forming the first image and the second image on the medium while moving the placement unit in the second direction, or executing the second mode by after moving the placement tray from the first position to the second position, changing the first direction to the second direction, and forming the first image and the second image on the medium.

* * * * *